Dec. 1, 1953  J. W. MATTHEWS  2,661,460
TRANSIENT PRESSURE DETECTOR
Filed July 12, 1950
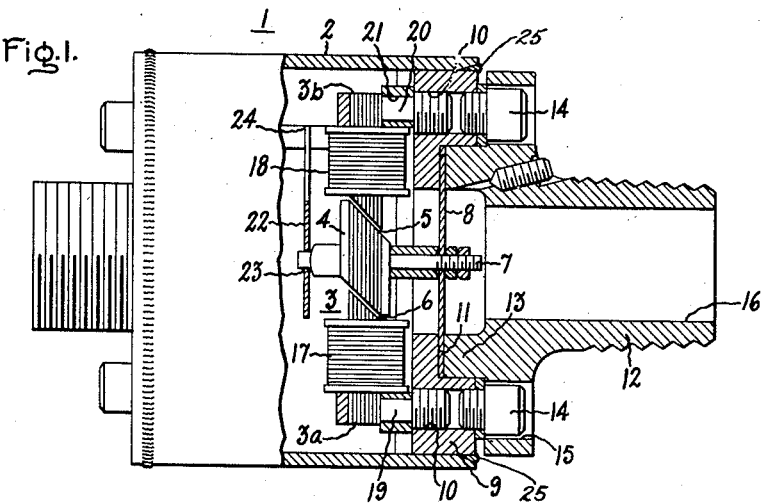
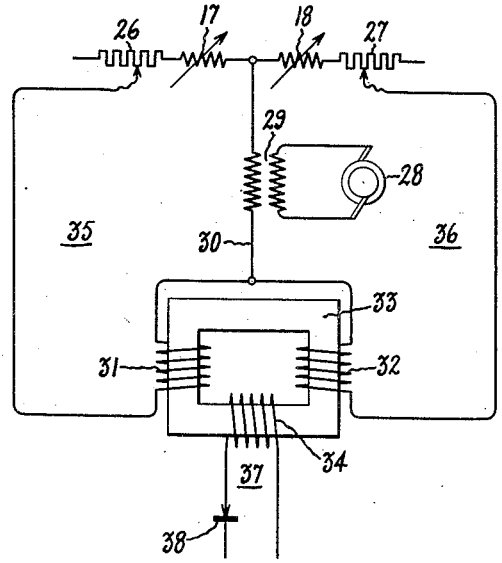
Inventor:
John W. Matthews,
by Paul A. Frank
His Attorney.

Patented Dec. 1, 1953

2,661,460

UNITED STATES PATENT OFFICE 2,661,460

TRANSIENT PRESSURE DETECTOR

John W. Matthews, Schenectady, N. Y., assignor to General Electric Company, a corporation of New York Application July 12, 1950, Serial No. 173,446

2 Claims. (Cl. 336—30)

This invention relates to a pressure measuring device and, in particular, to an improved structure and circuit for measuring instantaneous or transient pressures by electromagnetic means.

In stress analysis and design work, it is frequently desirable to measure instantaneous pressures that act on an object. For example, within an internal combustion cylinder at the moment of instantaneous peak pressure caused by the burning of fuel, or in a circuit breaker at the peak pressure caused by the arc at the time of the interruption of an electric circuit, peak pressures can exist for a very small fraction of a second. If these peak pressures are detected electrically, the signal which reflects them is usually of such a small value that an electronic amplifier is required to increase the signal to a value capable of being measured. Electronic amplifiers, however, superimpose electric waves on the test signal to the point where it is difficult to distinguish the test signal from noise generated within the amplifier. It is desirable, therefore, to produce an electromagnetic device capable of supplying test signals for the direct measurement of peak stresses.

This invention relates particularly to an improved type of an electromagnetic structure in which a change in pressure is utilized to vary an airgap in a magnetic structure which, in turn, varies the relative reluctances of the magnetic paths of impedances connected in a pair of balanced circuits to the extent that a signal is produced which is in proportion to pressure exerted upon the magnetic structure.

It is an object of this invention to provide a new and improved electromagnetic pressure detector.

It is another object of this invention to provide a test head for transient pressure measurement that is readily adjustable to accommodate a wide range of pressures.

It is another object of this invention to provide a test head of unusual sensitivity and which is relatively unaffected by changes in ambient pressure and temperature.

It is a further object of this invention to provide a new and improved circuit for measuring peak loads wherein a signal produced by an electromagnetic device is utilized to record a peak pressure.

It is a still further object of this invention to provide a new and improved circuit utilizing magnetic structure for test checks wherein a plurality of tests can be superimposed upon one recording instrument without the use of an electronic amplifier.

Briefly, this invention utilizes a pair of balanced circuits wherein a test signal is placed on each circuit and a change in reluctance in both of the circuits, such as one caused by an explosion, is utilized to produce a net voltage output of the two circuits which can be utilized, in turn, to operate a recording instrument such as an oscilloscope.

Further objects and advantages of this invention will become apparent and the invention will be more clearly understood from the following description referring to the accompanying drawing and the features of novelty which characterize this invention will be pointed out with particularity in the claims annexed to and forming a part of this specification.

In the drawing, Fig. 1 is a side view, partly in section, of the improved magnetic structure; while Fig. 2 is a schematic view of the circuit utilized with this improved magnetic structure.

Reference is now made to Fig. 1 for an illustration of the component parts of a test head embodying the present invention. Test head 1 comprises a casing 2 that encloses an electromagnetic structure 3 having three axially aligned sections or portions 3a, 3b, and a movable section 4, cut on a bias and positioned centrally between sections 3a and 3b to define airgaps 5 and 6 which separate section 4 from adjacent ends of sections 3a and 3b, respectively. Each of the sections 3a, 3b, and 4 comprises a series of laminated rectangular strips of magnetic material, such as soft iron. Segment 4 is movable transverse to the longitudinal axis of the magnetic structure 3 and the bias cut on each of its ends matches complementary cuts on sections 3a and 3b. By moving segment 4 transverse to the axis of magnetic structure 3, for example, if it is moved to the left in the drawing, airgap 6 is decreased and airgap 5 is increased. It is to be noted, however, that any movement of segment 4 transverse to the axis of structure 3 is such that the sum of the airgaps 5 and 6 remains constant. That is, as airgap 6 is decreased, airgap 5 is proportionately increased, with the sum of the two airgaps being constant.

A structure is provided to direct the transverse movement of segment 4. Specifically, a rod 7, or the like, is passed at right angles to the longitudinal axis of electromagnetic structure 3 through segment 4 and is secured thereto. A diaphragm 8 is then mounted on rod 7 with the plane of diaphragm 8 parallel to the longitudinal axis of structure 3. As diaphragm 8 is deflected, rod 7 moves segment 4 transverse to the longitudinal axis of magnetic structure 3. This changes the airgaps 5 and 6. For such action, it is necessary to mount the periphery of diaphragm 8 securely while allowing axial deflection along the axis of rod 7.

To mount diaphragm 8 and electromagnetic structure 3, a ring-shaped base plate 9 is provided with a plurality of threaded bolt holes 10. A recessed shoulder 11 is also provided in base plate 9 to accommodate diaphragm 8. Specifically, diaphragm 8 rests against shoulder 11 in the recessed portion of base plate 9. A cap 12, having a protrusion 13 that matches the recessed shoulder portion 11 of base plate 9, is provided to fit over diaphragm 8 and be locked in place by a plurality of bolts 14 which pass through bolt holes 15 in cap 12. Cap 12 provides a central axial opening 16 which connects the open end of cap 12 to diaphragm 8.

Referring again to electromagnetic structure 3, which is secured to base plate 9, a pair of inductance coils 17 and 18 are mounted, one on either side of segment 4. The function of the coils is to set up electromagnetic lines of force in the magnetic structure 3. These coils are secured in some fashion, such as by collars (not shown), onto electromagnetic structure 3 which, in turn, is adjustable along its longitudinal axis. For this adjustment, a pair of adjusting cam screws 19 and 20 are passed one each through elongated openings 21 in structure 3. Structure 3 is then axially movable by turning cam screws 19 and 20. The purpose of this construction is to allow for adjustment in the airgaps 5 and 6; specifically, by adjusting the airgap, it is possible to regulate the range of the gauge. By range is meant the pressure differential to which the test head 1 responds. For example, at minimum airgap when sections 3a and 3b are closest to section 4 in the inoperative position, the range of pressures for the test head is in the order of 0 to 8 pounds per sq. in., while, for maximum airgap, when sections 3 and 3a are farthest away from section 4 in the inoperative position, the range is in the order of from 0 to 800 pounds per sq. in. The reason for this adaptability to various ranges is that the reluctance change of the instrument is proportional to the dimensions of the preadjusted airgap. With a wider airgap, a greater movement transverse to the longitudinal axis of structure 3 is required for the same actual airgap change. Consequently, in order to have a reluctance change at the maximum setting that is equal to a reluctance change at the minimum setting of electromagnetic structure 3, a much greater transverse movement of segment 4 is required.

Rod 7, which passes through segment 4, is guided in its movement transverse to the axis of electromagnetic structure 3 by a plate 22 provided with bearing-like opening 23. Plate 22 is secured at 24 to casing 2 by suitable fastening means and guides the movement of bolt 7.

The mechanism so far described is all mounted within casing 2 and kept waterproof by a pair of gaskets 25, only one of which is shown.

An important feature of this structure is that the test coil 17 and the balancing coil 18 are each mounted in the same test head. The advantage of this lies in the fact that one setting of the test head calibrates it for any installation. Since repeated calibration is not required with this improved test head, much time is saved in making tests.

While they are not shown in the drawing, it is to be understood that suitable electric leads from an external power source are to be brought in through casing 2 to each of the coils.

Referring now to the schematic diagram in Fig. 2, the test coil 17 and the balance coil 18 are shown one each in series with variable resistors 26 and 27. The combination of one coil and one variable resistor is placed in a circuit to provide a pair of balanced circuits 35 and 36. A signal generator, such as that shown at 28, is used to impart a signal through transformer 29 to each of the circuits, through their common leg 30. A pair of coils 31 and 32 are wound one each around opposite legs of a transformer or magnetic structure 33, as shown in the diagram. Coil 31 is in the circuit with test coil 17 and variable resistor 26, while coil 32 is in the circuit with balance coil 18 and variable resistor 27. A third coil 34 is provided about a leg of magnetic structure 33 to be activated by flux linkages in the following manner. With the circuits as shown, signal generator 28 induces an alternating current through transformer 29 into each of the loop circuits 35 and 36. This alternating current passes through variable inductance 17, variable resistor 26, and coil 31 in loop circuit 35; and through variable inductance 18, variable resistance 27 and coil 32 in loop circuit 36. The two circuits 35 and 36 are balanced by resistors 26 and 27, while the test head is in its zero position, that is, when the three elements of magnetic structure 3 are in axial alignment and when diaphragm 8 is in its undeflected position. Then, any magnetic flux linkages set up in structure 33 by the current passing through coil 31 is offset by flux linkages set up by coil 32. Consequently, there is no net flow of electromagnetic lines of force through magnetic structure 33. In a test, however, when an impulse deflects diaphragm 8 and moves section 4, the airgaps 5 and 6 are changed, thus varying the reluctance of the magnetic paths of coils 17 and 18. This produces, for example, a net reduction in current passing through circuit 35 and a net increase in the current passing through circuit 36. Consequently, the flux linkages induced by coil 32 will be increased and the flux linkages induced by coil 31 will be decreased, whereupon a net flux linkage will be induced in magnetic structure 33. These flux linkages induce in coil 34 a voltage which is proportional to the change in reluctance of the magnetic paths of coils 17 and 18. The rectifier 38 rectifies the alternating current in circuit 37 produced by the voltage induced in coil 34. The signal produced by the rectifier may be measured in an oscillograph (not shown).

With this structure, it is to be noted that any change in the reluctance of the magnetic paths of coils 17 and 18 is reflected in the oscillograph, which normally carries a straight line curve when the circuits 35 and 36 are balanced. The oscillograph records a sudden peak voltage, the magnitude of which is proportional to the change in reluctance of the magnetic paths of coils 17 and 18. By using the rectified voltage instead of an alternating voltage for the test signal, it has been found that with the standard six inch oscillograph it is possible with this structure to make as many as six test checks at any one instant, while in the old type set-up it was unusual to be able to put two checks on one oscillograph film.

Tests have shown that this new and improved test head operates very efficiently and performs satisfactorily under many kinds of test loads. The impulses have been checked with the old type test head and the increase in savings of time and effort in using this improved test head are of great benefit. In addition, my invention allows many more tests to be made at one time than could have been made with previous test systems.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. In a test head for producing by electromagnetic means a signal proportional to pressure, a longitudinally extending magnetic structure comprising two aligned end portions mounted in spaced relationship and a central portion mounted between said end portions and spaced therefrom to provide air gaps therewith, all of the confronting ends of said central and end portions presenting surfaces substantially parallel to each other and inclined at a same oblique angle to the longitudinal axis of said structure, an inductance coil wound on each of said end portions, and pressure responsive means for moving said central portion transverse to the longitudinal axis of said structure simultaneously to increase one of said air gaps and to decrease the other of said air gaps thereby to produce in said two end portions a differential magnetic permeability varying in accord with the extent of said movement.

2. In a test head for producing by electromagnetic means a signal proportional to instantaneous or peak pressures, a longitudinally extending magnetic structure comprising two aligned end portions mounted in spaced relationship and a central portion mounted between said end portions and spaced therefrom to provide air gaps therewith, all of the confronting ends of said central and end portions presenting surfaces substantially parallel to each other and inclined at a same oblique angle to the longitudinal axis of said structure, an inductance coil wound on each of said end portions, means for adjusting the longitudinal spacing of each of said end portions from said central portion to adjust said air gaps, and pressure responsive means for moving said central portion transverse to the longitudinal axis of said structure simultaneously to increase one of said air gaps and to decrease the other of said air gaps thereby to produce in said two end portions a differential magnetic permeability varying in accord with the extent of said movement.

JOHN W. MATTHEWS.

References Cited in the file of this patent

UNITED STATES PATENTS

| Number | Name | Date |
|---|---|---|
| 1,718,494 | Schurig | June 25, 1929 |
| 2,510,073 | Clark | June 6, 1950 |

FOREIGN PATENTS

| Number | Country | Date |
|---|---|---|
| 403,602 | Great Britain | Dec. 28, 1933 |
| 36,951 | France | Sept. 13, 1930 |